(12) United States Patent
Woodul (10) Patent No.: US 9,758,717 B2
(45) Date of Patent: Sep. 12, 2017

(54) SYSTEMS AND METHODS FOR REMOVING CONTAMINANTS FROM HIGH DENSITY COMPLETION FLUID

(71) Applicant: WDWTechnologies LLC, The Woodlands, TX (US)

(72) Inventor: William D. Woodul, The Woodlands, TX (US)

(73) Assignee: WDWTechnologies LLC, The Woodlands, TX (US)

( * ) Notice: Subject to any disclaimer, the term of this patent is extended or adjusted under 35 U.S.C. 154(b) by 0 days.

(21) Appl. No.: 14/798,156

(22) Filed: Jul. 13, 2015

(65) Prior Publication Data
US 2016/0024377 A1    Jan. 28, 2016

Related U.S. Application Data (60) Provisional application No. 62/029,214, filed on Jul. 25, 2014.

(51) Int. Cl.
| C09K 8/84 | (2006.01) |
| B01J 19/24 | (2006.01) |
| B01J 19/18 | (2006.01) |
| E21B 21/06 | (2006.01) |

(52) U.S. Cl.
CPC .............. *C09K 8/845* (2013.01); *B01J 19/18* (2013.01); *B01J 19/24* (2013.01); *E21B 21/068* (2013.01); *B01J 2219/24* (2013.01)

(58) Field of Classification Search
None
See application file for complete search history.

(56) References Cited

U.S. PATENT DOCUMENTS

| 4,584,071 | A | 4/1986 | Bissot |
| 5,637,233 | A | 6/1997 | Earrusso |
| 7,022,240 | B2 | 4/2006 | Hart |
| 7,144,512 | B2 | 12/2006 | Qu |
| 7,244,363 | B2 | 7/2007 | Isaac |
| 8,070,962 | B2 | 12/2011 | Arvie |
| 8,454,816 | B1 | 6/2013 | Harrison |
| 2009/0183922 | A1 | 7/2009 | Smith |
| 2009/0184056 | A1* | 7/2009 | Smith ................. B01F 7/00816 210/712 |
| 2012/0145646 | A1 | 6/2012 | Bae |

(Continued)

FOREIGN PATENT DOCUMENTS

| EP | 0156059 A2 | 10/1985 |
| EP | 0221760 A2 | 5/1987 |
| WO | 2014089002 | 6/2014 |

*Primary Examiner* — Jeffrey Washville
(74) *Attorney, Agent, or Firm* — Park, Vaughan, Fleming & Dowler LLP; Shane Nelson (57) ABSTRACT

A system and method of decreasing contaminant concentration in an oilfield brine fluid, such as a high density completions fluid, that includes mixing the oilfield brine fluid with chlorine dioxide ($ClO_2$). The oilfield brine fluid includes dissolved contaminant, such as iron, and one or more dissolved salts, such as selected from the group consisting of NaCl, NaBr, $CaCl_2$, $CaBr_2$, and $ZnBr_2$. The mixing is for a time sufficient for the $ClO_2$ to react with at least one component of the oilfield brine fluid to form precipitated contaminant without reacting to the one or more salts.

15 Claims, 4 Drawing Sheets

(56) References Cited

U.S. PATENT DOCUMENTS

| | | |
|---|---|---|
| 2013/0015113 A1 | 1/2013 | Mussari |
| 2014/0121138 A1 | 5/2014 | Vollmer |
| 2014/0263088 A1* | 9/2014 | Mason .................... C02F 1/727 |
| | | 210/747.9 |
| 2016/0009980 A1* | 1/2016 | Gupta .................... C09K 8/524 |
| | | 166/300 |

* cited by examiner

SYSTEMS AND METHODS FOR REMOVING CONTAMINANTS FROM HIGH DENSITY COMPLETION FLUID

PRIORITY

This application claims priority to and the benefit of U.S. provisional patent application No. 62/029,214, filed on Jul. 25, 2014, in the name of the same inventor. The entire contents of the provisional application is incorporated herein by reference.

FIELD

The present disclosure relates to the treatment and/or reclamation of oil field high density completion fluids and other high density brines by using a selective oxidizing agent, such as chlorine dioxide.

BACKGROUND

Iron dissolved in various kinds of aqueous solutions causes many undesirable effects. Its removal has long been a problem in the oil and gas industry. As applied to workover and completion fluids used in hydrocarbon recovery, sometimes called clear completion brines, the background of the problem has been well described by Qu et al. in U.S. Pat. No. 7,144,512, as described below:

High density brines (completion brines) have been widely used in well completion and workover operations in oilfields in the past several decades. The completion brines are salt solutions typically having fluid densities ranging from about 8.4 ppg (pounds per gallon) to about 20 ppg. Depending on the density desired, a completion brine can be a one salt solution (e.g. NaCl, NaBr, $CaCl_2$, $CaBr_2$, $ZnBr_2$ or formate salt in water), a two salt solution (e.g. $CaCl_2/CaBr_2$ or $ZnBr_2/CaBr_2$), or a three salt solution (e.g. $ZnBr_2/CaBr_2/CaCl_2$). The composition of the brines determines the fluid properties such as pH, density, etc. Depending on the economics, a fluid can be used in a well and then purchased back to be cleaned and reused later.

At the conclusion of any completion or workover project, a substantial volume of "contaminated" or unneeded completion/workover fluid typically remains. Such fluids may be contaminated with any or all of the following: water, drilling mud, formation materials, rust, scale, pipe dope, and viscosifiers and bridging agents used for fluid-loss-control pills. Depending on their composition and level of contamination, these fluids may or may not have further practical or economic value. If it is deemed that the fluids have future use potential, they may be reclaimed. Conversely, if they are determined to have no further use, they must be disposed of in an environmentally responsible way.

The benefits derived from the use of solids-free fluids, and especially high-density brines, for completion and workover operations have been extensively documented in the literature. Unfortunately, the costs associated with the initial purchase and subsequent disposal of such brines has been a hindrance to their universal acceptance especially since the "use once and dispose" means of disposal is neither prudent nor economically sound.

Because of the relatively high cost and limited worldwide natural mineral resources available for producing medium- and high-density completion/workover fluids, it is essential that their used fluids be reclaimed. The reconditioned fluids must meet the same specifications as those of "new" or "clean" fluids. With respect to completion/workover fluids, the term "clean" denotes not only the absence of suspended solids but also the absence of undesirable colloidal or soluble species which are capable of undergoing adverse reactions with formation, formation fluids or other completion fluids to produce formation-damaging insoluble substances.

There are many known methods for removing contaminates from a brine solution. One approach is to remove suspended solids by filtration. Simple filtration processes, wherein the brine is filtered through a plate and frame type filter press with the use of a filter aid such as diatomaceous earth and then through a cartridge polishing filter, are effective to remove solid contamination but they have no effect on removing other types of contamination such as colloidal or soluble species. This is the case since colloidally dispersed and soluble contaminants cannot be removed by filtration without first treating the fluid to change the chemical and/or physical properties of the contaminants. The treatments required to salvage the fluid depend on the nature of the contaminants incorporated and their chemical and physical properties.

It is widely recognized that iron is a common contaminant in completion fluids. Accumulation of iron in a brine completion fluid may cause formation damage and affect the productivity of a well. In addition, iron may cause other negative effects, such as cross-linking, gelling of polymers, and increased stabilization of crude/brine emulsions. Completion fluids tend to accumulate dissolved contaminants, such as iron, when deployed into the well. Completion fluids are often used more than once, e.g., recovered from a wellbore and then used again. Oilfield specifications, such as those set by the American Petroleum Institute (API), may set an upper limit for the iron concentration in completion fluids, which may be exceeded in brine recovered from the wellbore. Thus, the contaminated brine is generally treated to remove the iron (and other contaminants). As compared to other fluids used in the oil and gas industry (such as produced fluids, which may be used as frac fluids), high density completion fluids tend to have significantly higher levels of dissolved iron in the fluids due to the corrosive nature and pH of the salts such as zinc bromide. Further, depending on the formation pressure, different compositions/weights of brines are used as completion fluids, and in some cases, zinc-bromide containing brines are often used in such dense-fluid applications.

As the prior art recognizes, zinc containing high-density brines have proven to be the most difficult to treat for iron removal. Most of the zinc-containing brines have relatively low pH, which often leads to high iron contamination during use as "conventional" completion and/or workover fluids. Iron contamination in such fluids can reach several hundred or even thousand milligrams per liter. Further, iron in zinc brine solutions is more likely to be in a soluble and stable form. Because of the low solubility of oxygen in such solutions, a significant percentage of the iron contaminants exist as ferrous iron. As a result, precipitation of iron is challenging. For example, if the pH of a solution is raised in the attempt to precipitate out the dissolved iron, the useful zinc and calcium bromide salts typically present in high-density completion fluids will also precipitate. It is even more challenging to remove iron from a zinc bromide containing solution without also removing the zinc.

Some conventional methods for treating used brine to meet oilfield specifications rely on removal of iron therefrom using strong oxidizers, such as hydrogen peroxide, to oxidize and precipitate the iron out of solution. Other conventional methods rely on the dilution of the contaminated brines using less dense brines, such as calcium chloride brines. However, removing dissolved iron from a zinc-bromide brine using strong oxidizers also tends to remove the zinc from the solution, which lowers the density of the fluid. Additionally, the use of less expensive fluids to dilute contaminated brines not only reduces the concentration of iron, but also lowers the density of the fluid, which may make it less suitable or desirable than the heavier brines. Ou et al. (U.S. Pat. No. 7,144,512) provides a solution to remove iron from a well completion brine solution that comprises zinc bromide using an organic chelant to form a complexed metal precipitate. Vollmer et al. (U.S. Pub. No. 2014/0121138) provides a method that recovers zinc, nickel, and iron from spent brines and produced water using a hydrazine complex. Such a solution, however, removes the desired zinc salts from the completion fluid and is intended to reduce the cost of disposing the substantially zinc free fluid. Bae et al. (U.S. Pub. No. 2012/0145646) discloses a method for removing iron from an aqueous solution by changing the pH with the addition of acids and a phosphate salt that would, if present, remove zinc and other similar salts. Smith et al. (U.S. Publication No. 2009/0184056) discloses a technique that uses a cavitation device together with an oxidizing agent and the addition of lime. Isaac (U.S. Pat. No. 7,244,363) discloses a method that treats heavy halide brines with permanganates to remove iron and other heavy metal contaminants. Each of these references is incorporated herein by reference.

As mentioned above and as obvious to one of ordinary skill in the art, the existing techniques for high-density completion fluids suffer from many disadvantages. While dissolved iron is a well-known problem in the oil and gas industry, no one has developed a practical, inexpensive, and effective solution for iron removal from high-density completion fluids. A need exists for a novel way to remove iron while keeping zinc in solution in a high-density completions fluid.

SUMMARY

Embodiments of the disclosure may provide a method of decreasing contaminant concentration in an oilfield brine fluid, such as a high density completions fluid, that includes mixing the oilfield brine fluid with chlorine dioxide ($ClO_2$). The oilfield brine fluid includes dissolved contaminant, such as iron, and one or more dissolved salts, such as selected from the group consisting of NaCl, NaBr, $CaCl_2$, $CaBr_2$, and $ZnBr_2$. The mixing is for a time sufficient for the $ClO_2$ to react with at least one component of the oilfield brine fluid to form precipitated contaminant without reacting to the one or more salts.

Embodiments of the disclosure may also provide a system for decreasing contaminant concentration in an oilfield fluid. The system includes a chlorine dioxide ($ClO_2$) source and one or more fluid vessels. The system also includes a contaminated high density brine of an oilfield fluid including dissolved contaminant, the oilfield fluid being disposed in at least one of the one or more fluid vessels. The system also includes a conduit coupled with the $ClO_2$ source and the one or more fluid vessels. The conduit receives $ClO_2$ from the $ClO_2$ source and delivers the $ClO_2$ to at least one of the one or more fluid vessels. The $ClO_2$ reacts with the contaminated brine in at least one of the one or more fluid vessels, causing at least a portion of the dissolved contaminant to precipitate from solution without reacting with one or more of the original (make-up) salts that are present in the contaminated brine.

The foregoing summary is intended to introduce a subset of the various aspects of the embodiments of the present disclosure and should not be considered limiting.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. The various embodiments are not necessarily mutually exclusive, as some embodiments can be combined with one or more other embodiments to form new embodiments. Likewise, particular features, structures, or characteristics of one embodiment may be combined in any suitable manner with particular features, structures, or characteristics of another embodiment. Wherever possible, the same reference numbers will be used throughout the drawings to refer to the same or like parts.

As mentioned earlier, a need exists for a novel way to remove iron (a contaminant) while keeping zinc in solution in a high-density completions fluid at or around the same level prior to treatment. What is needed is a compound and/or material that is reactive enough to react with and/or oxidize the undesired contaminant (e.g., iron) while being not reactive enough to oxidize or react with a desired component of the fluid (e.g., one or more salts, such as zinc). Many compounds are known to act as an oxidizing agent according to basic chemistry, including manganese reagents, chromium reagents, nitric acid, ozone, hydrogen peroxide, copper/silver, fluorine, hydroxyl radical, ozone, hydrogen peroxide, potassium permanganate, chlorine, and air. These materials would typically be too strong and remove both the iron and the zinc, or too weak and not remove the zinc or iron. Both results are undesirable.

Chlorine dioxide ($ClO_2$) is an oxidizer. In some situations, it may act as a selective oxidizer, in that it preferentially oxidizes one material first and does not substantially oxidize a second material at or near the same time. For example, with a high density completions fluid containing zinc and iron, chlorine dioxide is a strong enough oxidizer to remove iron first but is not strong enough to remove a substantial amount of zinc at the same time. Further, chlorine dioxide is highly effective (e.g., retains its oxidative properties) over a wide range of pH (such as between 2-10 pH) and has a high water solubility.

Chlorine dioxide has been used as a disinfectant/biocide in the water treatment industry for decades to remove bacteria. In other industries, chlorine dioxide has been used for bleaching of wood pulp and the bleaching of flour, and in food and beverage plants for hard surface sanitation and fruit and vegetable processing. Chlorine dioxide's use in the oil and gas industry is relatively new, and has been brought into the industry primarily as a biocide for oil and gas disinfection applications for effective microbial control. In one disclosure, chlorine dioxide has been used to treat waste water (such as produced water and flowback water) to remove bacteria and other contaminants to be further used as a fracturing or "frac" fluid. See, e.g., U.S. Pub No. 2014/0263088, incorporated herein by reference. However, no process exists that uses chlorine dioxide to treat high density completions fluids to selectively remove iron and keep desired salts, such as zinc.

The industry uses the word "completions fluid" inconsistently. The historical term of completions fluids refers to manufactured high density brines. In certain instances, the term completions fluid may be used to describe produced water, flowback water, and/or frac water. In this disclosure, high-density completions fluids are manufactured brines, e.g., fluids with specific salt concentrations added to meet a required density. High density completions fluids are not intended to include naturally occurring brines such as produced water, flowback water, and/or frac water.

The disclosed embodiment(s) provides a novel solution to one or more of the oil and gas industry's needs previously described herein and offers superior advantages over conventional treatment techniques for a high density completion fluid. The disclosed embodiments include systems and methods for reducing the contamination of a high density completions fluid by mixing chlorine dioxide with the fluid. After sufficient mixing, the chlorine dioxide reacts with one or more contaminants (such as iron) while leaving substantially untouched (e.g., does not react with) one or more salts (such as zinc). In one embodiment, the high density completions fluid is a high density zinc-bromide ($ZnBr_2$) containing completions brine fluid having an iron concentration of greater than 50 mg/L and a density of 15.0 lb/gal or greater. One of ordinary skill will recognize that the described embodiments may be expanded for use in different types of high density completion fluids, such as any completion brines with a solution having fluid densities ranging from about 9 ppg (with the use of a NaCl or KCl salt) to about 21 ppg (with the use of a $ZnBr_2$ salt). Further, based on the desired density, the completions brine can be a one salt solution (e.g. NaCl, NaBr, $CaCl_2$, $CaBr_2$, $ZnBr_2$ or formate salt in water), a two salt solution (e.g. $CaCl_2$/$CaBr_2$ or $ZnBr_2$/$CaBr_2$), or a three salt solution (e.g. $ZnBr_2$/$CaBr_2$/$CaCl_2$). Further, the properties (such as pH, density, etc.) of the high density completions fluid varies with the composition of the brine. For example, undiluted brines may have a range of pH between 1.5-8.5, including approximately 6.5-7.5 pH for a $CaBr_2$ based brine and 1.5-5 pH (based on various weighted densities) of a multiple salt solution $ZnBr_2$ based brine. Various types and compositions of high density completions fluids are well known in the industry. One of ordinary skill will recognize that the described embodiments may be expanded for use in different types of "manufactured" fluids besides high density completions fluids. For example, besides a completion fluid, the treated fluid may be a workover fluid or a drill-in fluid.

Figure 1:
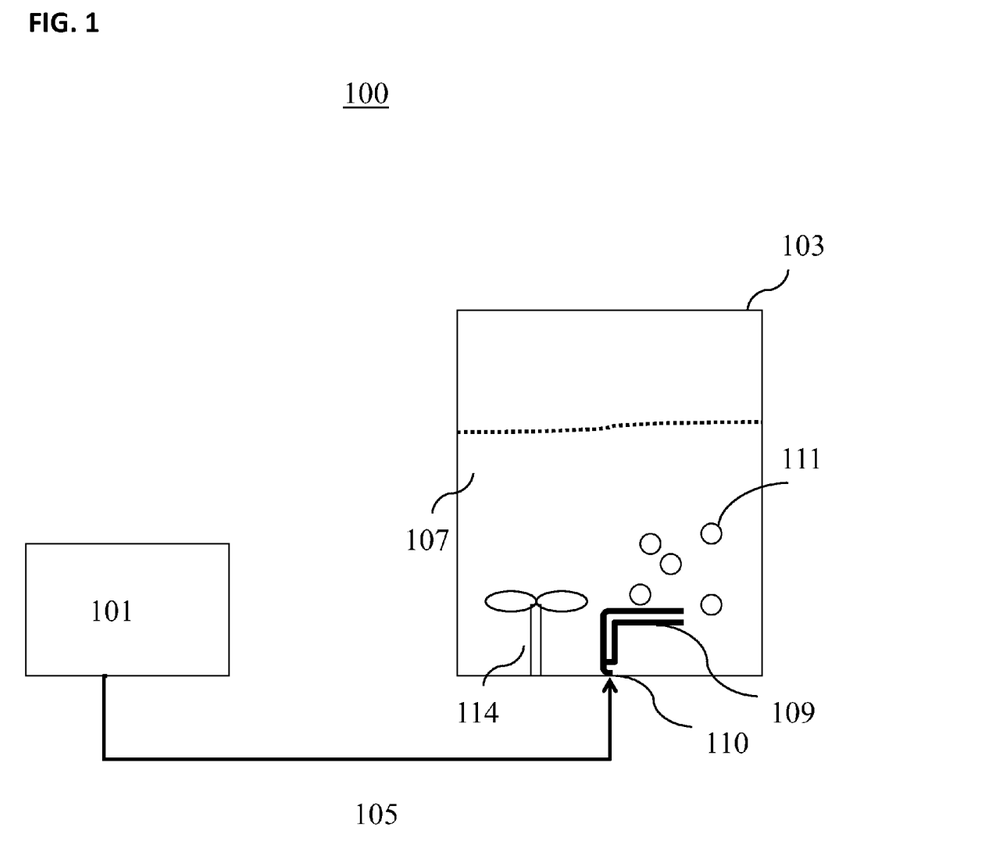
FIG. 1 illustrates a system for decreasing contaminant concentration in an oilfield fluid, according to one embodiment.

FIG. 1 illustrates one embodiment of a system for decreasing contaminant concentration in a high density completion fluid. FIG. 1 illustrates a schematic view of a system 100, for example, a reclamation system, for decreasing contaminant concentration in an oilfield fluid 107, according to an embodiment. Fluid 107 may be a contaminated oilfield brine fluid that includes dissolved iron as a contaminant and may include zinc bromide ($ZnBr_2$). The system 100 includes one or more $ClO_2$ sources 101 coupled to at least one vessel 103 via conduit 105. As used herein, vessel may mean any storage container, tank, glass lined tank or other device suitable for holding liquids, such as high-density completions fluids, and may be mobile or stationary. The vessel and/or tank may be an open top tank or a vented tank. Chlorine dioxide cannot be compressed or transported like chlorine gas and must be generated at the point of application using chlorine dioxide generation equipment, such as $ClO_2$ source 101. There are a variety of methods to produce $ClO_2$, and this disclosure is not dependent on how the chlorine dioxide is produced. The source 101 may be or include a reservoir of pre-generated $ClO_2$, or may be a $ClO_2$ generator that is configured to produce $ClO_2$ from one, two, three or more chemical precursors, in any suitable fluid. Prior to entry into conduit 105—or in some instances while in transit in conduit 105—the chlorine dioxide may be mixed with one or more solutions (such as water or the contaminated brine). Conduit 105 may include or be coupled to one or more pumps, sensors, or other valves for appropriate piping of the chlorine dioxide from the $ClO_2$ source 101 to vessel 103. Vessel 103 may be any container, tank, chamber, or vessel that is configured to hold a high density completion fluid 107 and allow the chlorine dioxide to react with the fluid for a sufficient time. Thus, in one embodiment, vessel 103 may be a reaction tank or chamber. Fluid 107 may be introduced into vessel 103 prior to the introduction of chlorine dioxide gas. Depending on the composition of fluid 107, one or more coagulants, pH adjusting chemicals such as lime, and/or flocculants may be added to the fluid 107 prior or after to the introduction of chlorine dioxide gas. Likewise, the fluid 107 may be centrifuged after the chlorine dioxide injection to facilitate precipitation/separation of the contaminant. Further, the pressure, temperature, and/or pH may be adjusted in fluid 107 and/or vessel 103 to provide more beneficial conditions for selective oxidation. These conditions may vary based upon the weight of the high-density completions fluid, the type of and/or amount of contaminant(s) present in the fluid, and the type of and/or amount of salts present in the fluid.

Conduit 105 connects $ClO_2$ source 101 to vessel 103. In one embodiment, conduit 105 connects to vessel 103 at an inlet 110 that is centrally located on or near the bottom of vessel 103, while in other embodiments conduit 105 connects to vessel 103 at another location or inlet of the vessel. In one embodiment, conduit 105 may comprise or be coupled to a perforated tubular member 109. Because the chlorine dioxide gas bubbles up through fluid 107, tubular member 109 may be disposed at or near a bottom portion of vessel 103. Accordingly, $ClO_2$ gas may be introduced into the fluid 107 via gas bubbles 111 that exit tubular member 109. In other embodiments, tubular member 109 or similar vessel input conduit may not be directly connected to the bottom of vessel 103 but may instead go up and over an edge of the tank and then down to the bottom of the tank. Chlorine dioxide bubbles 111 react with fluid 107 in vessel 103 to precipitate iron or another contaminant out of solution. The concentration and/or mixing time of the chlorine dioxide can be varied to increase the reaction to and precipitation of the contaminant. In one embodiment, substantially all of one or more contaminants (such as iron) is precipitated out of fluid 107. Further, in addition to precipitating iron from fluid 107, in other embodiments, any material that may be selectively precipitated out of and/or otherwise removed from solution via a reaction with an oxidant such as $ClO_2$ may be removed as a contaminant, such as entrained hydrocarbons and $H_2S$. Because $ClO_2$ acts as a selective oxidant at various conditions, the desired salt (such as zinc) is not reacted to and/or precipitated out of fluid 107. In one embodiment, substantially all of the desirable salt remains soluble in fluid 107. In other embodiment, a majority of the desirable salt remains soluble in fluid 107. While not shown, any number of solids removal devices that are common to the completion fluids industry, such as filters or centrifuges, may be used with and/or coupled to vessel 103 to remove the contaminate precipitate from the fluid 107 and/or vessel 103. In some embodiments, vessel 103 may also comprise one or more mixing devices 114, such as a propeller or gun line, to facilitate mixing of the chlorine dioxide with fluid 107.

Figure 2:
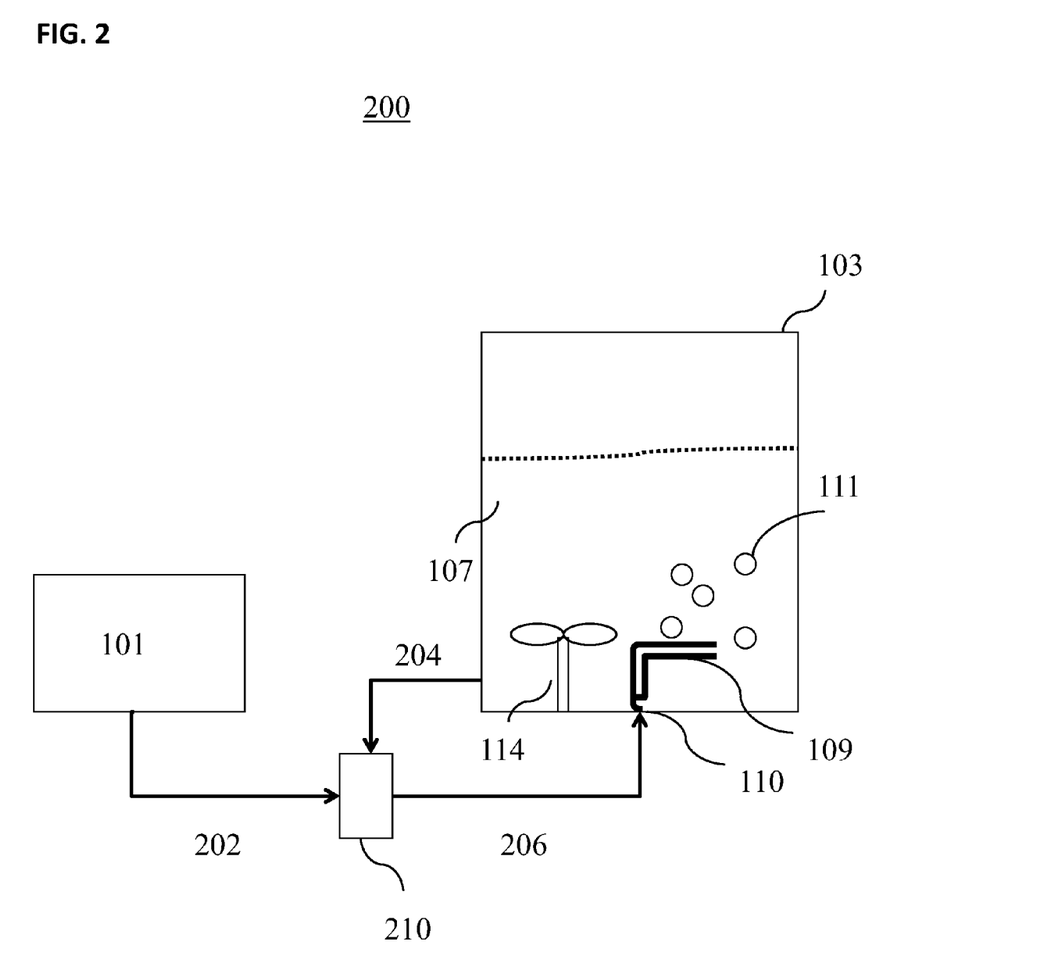
FIG. 2 illustrates a system for decreasing contaminant concentration in an oilfield fluid, according to another embodiment.

FIG. 2 illustrates another embodiment of a system for decreasing contaminant concentration in a high density completions fluid. FIG. 2 is similar to FIG. 1, but includes the use of $ClO_2$ mixing device 210. In certain situations, it is necessary to create chlorine dioxide using a fluid, and one such fluid typically used is water. Because dilution of fluid 107 by water may be undesirable in certain conditions (e.g., such water dilution may destroy the value and/or desired properties of the high density completions fluid 107), a premixture of fluid 107 may be used to create the chlorine dioxide gas. Thus, system 200 may include a mixing and/or pumping device 210 for drawing $ClO_2$ precursors from the at least one source 101 via line 202 and into a conduit that is coupled to vessel 103. In embodiments where there are multiple $ClO_2$ sources, mixing device 210 is configured to draw particular precursor fluids from each of the plurality of $ClO_2$ sources as is known in the art. In one embodiment, conduit 204 is routed from vessel 103 to mixing device 210 to supply mixing device 210 with a first volume of fluid 107 that is present in vessel 103. The use of first volume of fluid 107 as a motive fluid is preferable to water (or another fluid) used as the motive fluid because the introduction of fluid 107 back into vessel 103 does not change the composition of the fluid. One or more chlorine dioxide precursors supplied in line 202 is combined with the first volume of fluid 107 at mixing device 210 to create a first mixture of chlorine dioxide and fluid that is supplied in conduit 206 to vessel 103. While there may be minimal mixing/reacting of the chlorine dioxide with the fluid in conduit 206 prior to entry to the vessel, the primary purpose of this combination and/or premixture is an effective transport of the chlorine dioxide gas to the vessel 103 and fluid 107. Conduit 204 may be routed to deliver fluid from any portion (lower, middle, top, etc.) of vessel 103. Further, the fluid may be motive in conduits 204 and 206, e.g., pumped therein using any suitable pumping mechanism, gravity, and/or the like.

Thus, in one embodiment, system 200 is configured to mix one or more $ClO_2$ precursors with a first portion of fluid 107 before introducing the $ClO_2$ with a second portion of fluid 107. In one embodiment, the first portion of fluid 107 is relatively small compared to the relatively large volume of the second portion of fluid 107 in vessel 103. In one embodiment, the combined $ClO_2$ precursor and first portion of fluid 107 forms a "premixture." The system is configured to route the premixture of $ClO_2$ and oilfield brine fluid from mixing device 210 to vessel 103.

In one embodiment, mixing device 210 may be a venturi injector, and the fluid flow through conduit 204 may serve as a low-pressure stream, which the device 210 may employ to pump the $ClO_2$ precursor from the at least one source 101 and into conduit 206 to vessel 103. In one embodiment, a first volume of fluid in conduit 204 may apply a pressure differential across device 210, which may cause the $ClO_2$ to be drawn from the source (or sources) 101 into device 210 and mixed with the fluid therein to be output into conduit 206. In one example, the pressure differential developed across the device 210 by fluid 107 in conduit 204 may be about from 20 psi to about 200 psi, from about 40 psi to about 150 psi, from about 60 psi to about 100 psi, or about 80 psi.

Figure 3:
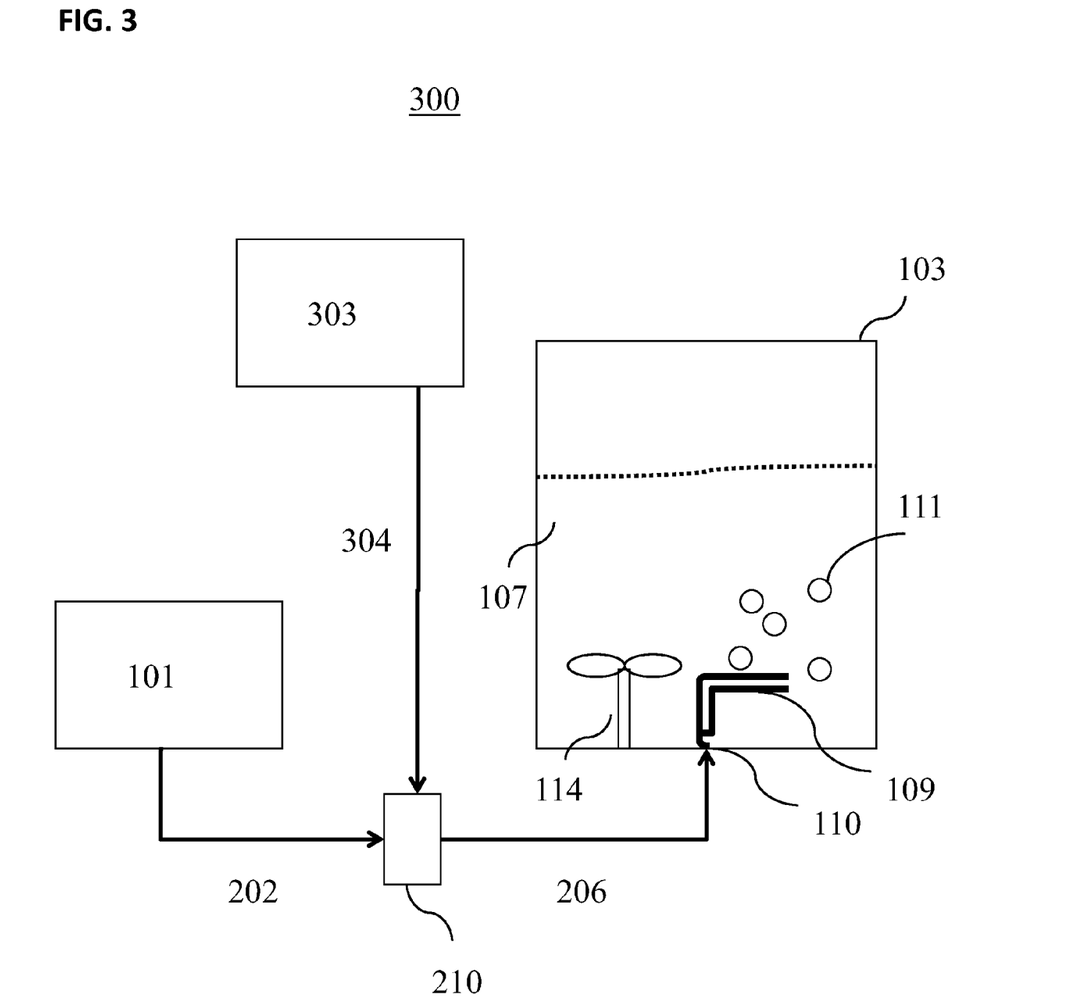
FIG. 3 illustrates a system for decreasing contaminant concentration in an oilfield fluid, according to another embodiment.

FIG. 3 illustrates another embodiment of a system for decreasing contaminant concentration in a high density completions fluid. FIG. 3 is similar to FIG. 2, but includes the use of second vessel (such as a storage tank) to supply fluid rather than using fluid directly from vessel 103. In one embodiment, system 300 includes a first vessel 303, such as a storage tank, and a second vessel 103, such as a reaction chamber. Mixing device 210 is configured to mix and/or draw one or more $ClO_2$ precursors from the at least one source 101 via line 202 with fluid supplied from storage tank 303 via conduit 304 and is further configured to supply a premixture of fluid and chlorine dioxide to vessel 103 via conduit 206. In one embodiment, storage tank 303 may be, for example, loaded onto or otherwise part of a truck or marine vessel that transports oilfield fluids. In an example, storage tank 303 may initially be empty and may subsequently be filled with the contaminated oilfield brine 107 via transfer from another storage tank, such as a truck that transports oilfield fluids. In one embodiment, fluid 107 is not provided directly into vessel 103 prior to the introduction of chlorine dioxide but is instead provided from vessel 303 and only introduced into vessel 103 through conduit 206 after the fluid is combined with chlorine dioxide with mixing device 210. This configuration may allow for increased operational control of the chlorine dioxide reaction with fluid 107. In another embodiment, a first portion of the contaminated fluid 107 is provided in vessel 303 and a second portion of the contaminated fluid 107 is provided in vessel 103, such that the first portion of fluid is routed through mixing device 210 to create a chlorine dioxide premixture prior to mixing with the second portion of the contaminated fluid in vessel 103. In still another embodiment, the fluid contained in vessel 303 may not be the same fluid 107 to be treated in vessel 103 and all or substantially all of contaminated fluid 107 is initially located in vessel 103. In this situation, fluid in vessel 303 may be selected based on the composition of the fluid 107 and particular reaction conditions necessary to effectively precipitate the contaminant and create the desired end completions fluid product. In still other embodiments, after the iron has precipitated out of solution and been filtered, separated, and/or otherwise recovered, the remaining fluid may be recovered as a recovered brine fluid and may be routed to one or more storage tanks (including routing back to storage tank 303) for subsequent storage, sale, and/or reuse (e.g., deployment into a wellbore).

In other embodiments, one or more of the reaction chamber 103 and storage tank 303 may be mobile or stationary. In other embodiments, a plurality of storage tanks 303 may be used and coupled to one or more mixing devices 210. In still other embodiments, the entire system 100, 200, or 300 may be mobile and be part of a mobile oilfield fluid treatment unit. Such systems may be located on a trailer and be transported from site to site as necessary. Accordingly, contaminated oilfield brine fluid may be processed "on site" such that the fluid does not need to be transported to a remote location away from the well site in order to proceed with removal of dissolved iron or other contaminants. In still another embodiment, the system may be located on or close to the ocean and configured to be coupled to marine vessels with storage tanks similar to that described in FIGS. 1-3. For example, one or more tanks with the contaminated fluid (such as vessel 103) may be located on a dock, trailer, or marine vessel, and a trailer, vessel, or other mobile unit may be transported to the site containing the necessary reservoirs of pre-generated $ClO_2$ (or may be a $ClO_2$ generator that is configured to produce $ClO_2$ from one, two, three or more precursors) such as source 101 and necessary conduits and mixing devices to introduce chlorine dioxide into the contaminated fluid being held in a vessel. It is obvious to one of ordinary skill that the above systems can apply to contaminated fluid taken from wells located on land as well as from wells located subsea, and that such treatment operations can apply to land or sea operations and to the fluids obtained from such operations.

Figure 4:
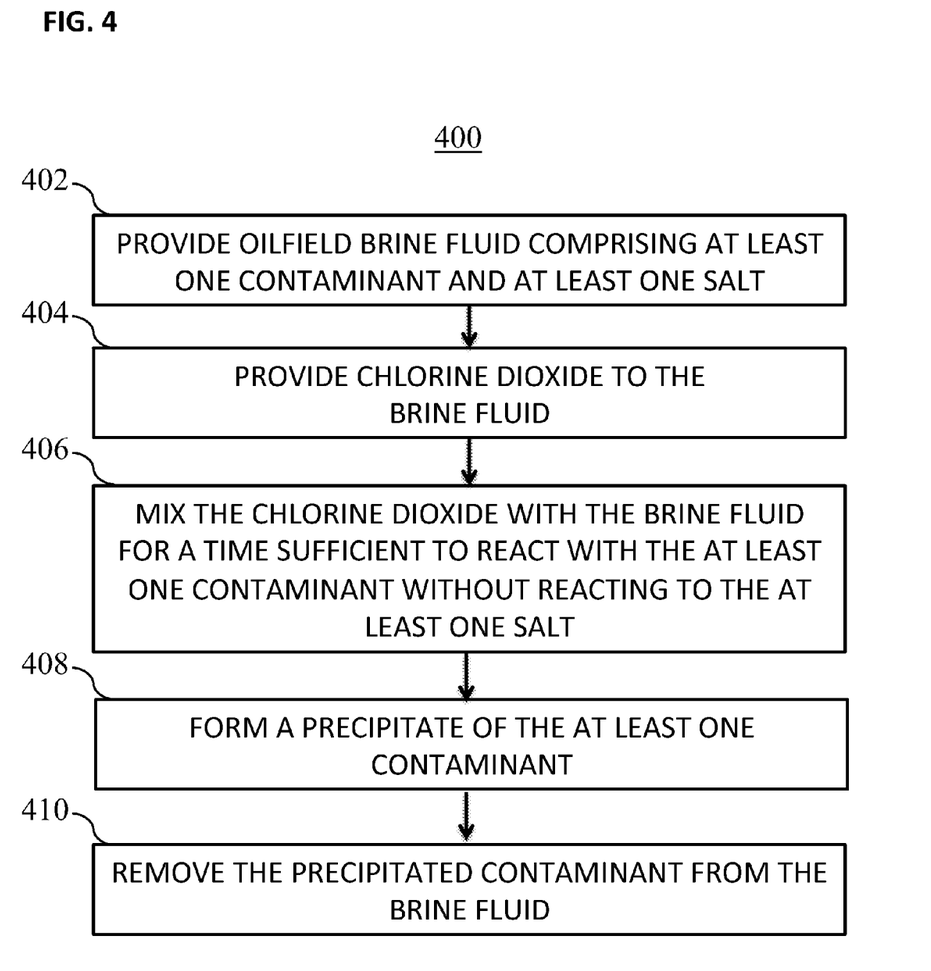
FIG. 4 is a flow chart depicting a method of decreasing contaminant in an oilfield fluid, according to one embodiment.

FIG. 4 depicts a flowchart of a method 400 of decreasing contaminant concentration in a contaminated oilfield brine fluid, such as fluid 107 in systems 100, 200, or 300. Method 400 includes providing an oilfield brine fluid that comprises at least one contaminant and at least one salt to a vessel, as shown in block 402. In one embodiment, the contaminant may be dissolved iron at a concentration of over 50 ppm, the at least one salt may be dissolved zinc bromide, and the fluid may be a high density completions fluid of at least 15 ppg. The method 400 further includes providing (e.g., injecting/mixing) chlorine dioxide to the brine fluid, as shown in block 404. The amount of $ClO_2$ that is added to the fluid may depend on the concentration of dissolved contaminant and salinity of the fluid, among other factors. The chlorine dioxide may be provided to a fluid vessel directly or may be combined with a small portion of the contaminated fluid as a premixture prior to introduction to a vessel containing the brine fluid. The chlorine dioxide may be generated on site through one or more $ClO_2$ sources, precursors, and/or mixing devices as is known in the art. With respect to system 200, fluid 107 may be recirculated through mixing device 210 from a vessel and returned to the same vessel while being continuously or intermittently mixed with fresh $ClO_2$. With respect to system 300, fluid 107 may be transported to mixing device 210 from a first vessel, such as storage vessel 303, premixed with $ClO_2$, and delivered to a second vessel, such as reaction chamber 103. The method 400 further includes mixing the chlorine dioxide with at least a first volume of contaminated brine fluid for a time sufficient for the $ClO_2$ to react with the at least one contaminant without reaction to the at least one salt, as shown in block 406. Depending on the contaminant, salt, and/or fluid mixture and properties, substantially all of the contaminant is reacted with and substantially none of the salt is reacted with. In one embodiment, after sufficient reaction time, the dissolved iron contaminant concentration in the fluid decreases from significantly greater than 50 ppm to about or less than 50 ppm. In the case that the oilfield brine fluid contains zinc, such as $ZnBr_2$, the amount of zinc remaining in the brine after the mixing may be the same as, or substantially the same as, an amount of zinc in the brine before the mixing. In other words, because $ClO_2$ selectively oxidizes iron to precipitate it out of solution but does not react to precipitate out zinc, implementation of method 400 may avoid zinc removal from the oilfield brine fluid during the treatment process. The method further includes forming a precipitate (such as non-soluble iron) of the at least one contaminate, as shown in block 408. In an embodiment, a pH of the mixture may be monitored to ensure that it remains within a predetermined range, and various coagulants or chemicals may be added to aid in the precipitation forming process. The method may further include removing the precipitated contaminant from the brine fluid, as shown in block 410. After the contaminated materials have been removed from the brine fluid, the fluid can be reused as a completions fluid and transported to storage or to a well site as appropriate.

EXAMPLES

Example 1

A flask was partially filled with a 16.6 lb/gal high density $ZnBr_2$ completions brine fluid having an iron concentration of approximately 450 mg/L. The fluid was a dark red. A solution of chlorine dioxide ($ClO_2$) was added to the fluid in the flask, stirred for 10 minutes using a mechanical stir bar, and then allowed to sit undisturbed overnight at room temperature and pressure. After such time, there was a red precipitate at the bottom of the flask. The brine was filtered via syringe through a 5 micron filter. The filtered brine was clear with a reddish-brown tint to it. The iron concentration in the filtered brine was less than 20 mg/L. Only a red precipitate was present, which indicates that no zinc precipitate (which is white) was created. To verify that zinc remained in the solution, an excess of potassium hydroxide (KOH) was added to the filtrate and immediately upon addition a white precipitate was formed, indicating a presence of zinc hydroxide. Thus, the $ClO_2$ acted as a selective oxidant in the high density brine fluid to remove iron and not zinc.

While the present teachings have been illustrated with respect to one or more implementations, alterations and/or modifications may be made to the illustrated examples without departing from the spirit and scope of the appended claims. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages may be added or existing structural components and/or processing stages may be removed or modified. Further, one or more of the acts depicted herein may be carried out in one or more separate acts and/or phases.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of decreasing contaminant concentration in a high density completions fluid, comprising:
    mixing the high density completions fluid with chlorine dioxide ($ClO_2$), wherein the high density fluid comprises at least one dissolved contaminant and one or more dissolved salts, and wherein the mixing is for a time sufficient for the $ClO_2$ to react with the at least one dissolved contaminant without reacting with the at least one dissolved salt,
    wherein the high density completions fluid comprises a manufactured brine with a density of 15 ppg or greater,
    wherein the at least one dissolved contaminant comprises dissolved iron with a concentration of 50 ppm or greater prior to the mixing,
    wherein the one or more dissolved salts comprises at least zinc bromide;
    forming a precipitate of the at least one dissolved contaminant without forming a precipitate of the at least one dissolved salt; and
    verifying that the at least one dissolved salt substantially remains in the high density completions fluid after the mixing step.

2. The method of claim 1, wherein a concentration of the at least one dissolved contaminant is less than about 50 ppm after the mixing.

3. The method of claim 1, further comprising removing the precipitate from the fluid.

4. The method of claim 1, wherein the one or more salts is further selected from the group consisting of formate salts, NaCl, NaBr, $CaCl_2$, and $CaBr_2$.

5. The method of claim 1, wherein the fluid comprises a plurality of salts.

6. The method of claim 1, wherein an amount of zinc remaining in the fluid after the mixing is substantially the same as an amount of dissolved zinc in the fluid before the mixing.

7. The method of claim 1, further comprising premixing a first volume of the fluid with a first volume of the $ClO_2$ to form a premixture and providing the premixture to a vessel containing a second volume of the fluid.

8. The method of claim 1, wherein the fluid is supplied from a first vessel, and wherein the mixing occurs in a second vessel.

9. A method of decreasing iron concentration in a high density completions fluid, comprising:
    mixing the high density completions fluid with chlorine dioxide ($ClO_2$), wherein the high density fluid comprises a manufactured brine with a density of 15 ppg or greater and dissolved iron and one or more dissolved salts, and wherein the mixing forms an iron precipitate, wherein the high density completions fluid prior to mixing has an iron concentration greater than 50 ppm, and wherein the high density completions fluid after mixing has an iron concentration less than 50 ppm, wherein the one or more dissolved salts comprises at least zinc bromide, wherein an amount of dissolved salt remaining in the fluid after the mixing is substantially the same as an amount of dissolved salt in the fluid before the mixing;
    forming a precipitate of the iron without forming a precipitate of the zinc bromide;
    verifying that the zinc bromide substantially remains in the high density completions fluid after the mixing step; and
    removing the iron from the high density completions fluid without substantively removing the zinc bromide from the high density completions fluid.

10. The method of claim 9, wherein the one or more dissolved salts is a plurality of salts further selected from the group consisting of formate salts, NaCl, NaBr, $CaCl_2$, and $CaBr_2$.

11. The method of claim 1, wherein the verifying step comprises verifying that the at least one dissolved salt concentration of the high density completions fluid is substantially the same before and after the mixing step.

12. The method of claim 1, wherein the $ClO_2$ does not substantively react with the at least one dissolved salt.

13. The method of claim 9, wherein the one or more salts comprises $ZnBr_2$.

14. The method of claim 1, further comprising removing the iron from the high density completions fluid without substantively removing the zinc bromide from the high density completions fluid.

15. The method of claim 1, further comprising substantively oxidizing the iron in the high density completions fluid without substantively oxidizing the zinc bromide in the high density completions fluid.

* * * * *